United States Patent
Zhang et al.

(10) Patent No.: US 12,502,123 B2
(45) Date of Patent: Dec. 23, 2025

(54) TECHNIQUES FOR ESTIMATING SKIN TONE USING A MACHINE LEARNING MODEL

(71) Applicant: Oura Health Oy, Oulu (FI)

(72) Inventors: Xi Zhang, Daly City, CA (US); Cristina Noujaim, Mountain View, CA (US); Nina Thigpen, Jersey City, NJ (US)

(73) Assignee: Oura Health Oy, Oulu (FI)

( * ) Notice: Subject to any disclaimer, the term of this patent is extended or adjusted under 35 U.S.C. 154(b) by 411 days.

(21) Appl. No.: 18/320,844

(22) Filed: May 19, 2023

(65) Prior Publication Data

US 2024/0382148 A1 Nov. 21, 2024

(51) Int. Cl.
  *A61B 5/00* (2006.01)
(52) U.S. Cl.
  CPC ............ *A61B 5/441* (2013.01); *A61B 5/0059* (2013.01); *A61B 5/6826* (2013.01)
(58) Field of Classification Search
  CPC . A61B 5/0059; A61B 5/1455; A61B 5/14552; A61B 5/441; A61B 5/6826
  See application file for complete search history.

(56) References Cited

U.S. PATENT DOCUMENTS

| | | | |
|---|---|---|---|
| 2008/0039729 A1* | 2/2008 | Cho ..................... | A61B 5/4869 600/473 |
| 2024/0138728 A1* | 5/2024 | Dietiker ............ | A61B 5/14552 |
| 2024/0219237 A1* | 7/2024 | Mäkinen ................... | G01J 3/50 |
| 2024/0298961 A1* | 9/2024 | Perchik ................ | A61B 5/7267 |

* cited by examiner

*Primary Examiner* — Eric F Winakur
(74) *Attorney, Agent, or Firm* — Holland & Hart LLP

(57) ABSTRACT

Methods, systems, and devices for estimating skin tone using a machine learning (ML) model are described. A wearable device may transmit light using a light-emitting component, and generate a signal based on the light received at a photodetector. In some examples, a strength of the received signal may be maintained within a signal strength band. The wearable device may identify a data set pair based on the signal, the data set pair including the signal strength band and a transmit power parameter that corresponds to the signal strength band. The data set pair may be inputted into an ML model and the ML model may output a skin tone metric for the user. The estimated skin tone metric may then be used to adjust measurement parameters used by the wearable device to improve a quality of physiological data, or validate algorithms used by the wearable device across skin tones.

20 Claims, 8 Drawing Sheets

TECHNIQUES FOR ESTIMATING SKIN TONE USING A MACHINE LEARNING MODEL

FIELD OF TECHNOLOGY

The following relates to wearable devices and data processing, including techniques for estimating skin tone using a machine learning (ML) model.

BACKGROUND

Some wearable devices may be configured to collect data, such as physiological data, from the user of the wearable device. To determine the physiological data, the wearable device may analyze characteristics of light (e.g., signal strength, signal intensity, absorption, reflectance, etc.) received and transmitted using one or more optical components of the wearable device. However, various attributes of the user (e.g., a skin tone of the user) may impact the signal quality of the physiological data.

DETAILED DESCRIPTION

Figure 1:
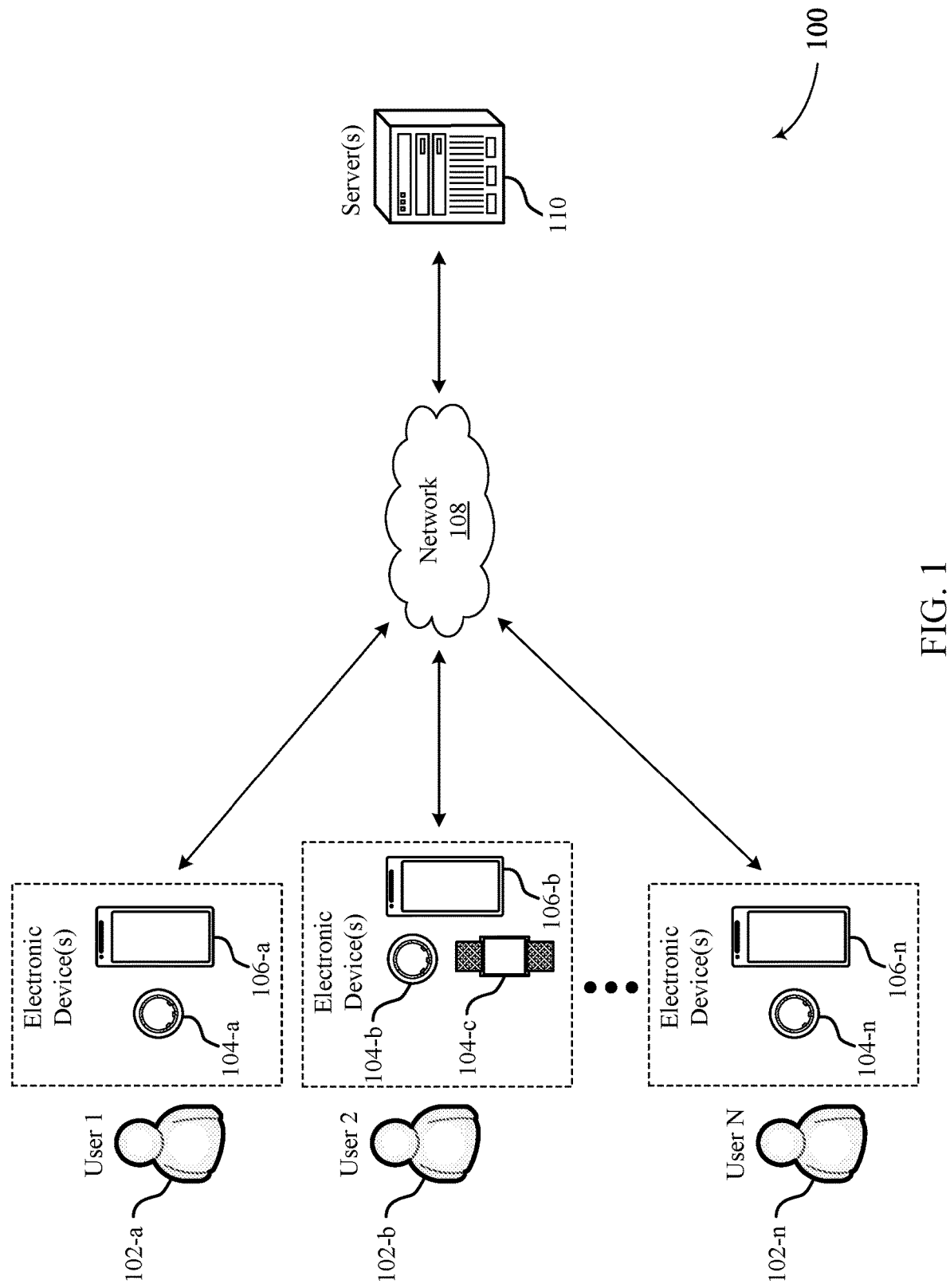
FIG. 1 illustrates an example of a system that supports techniques for estimating skin tone using a machine learning (ML) model in accordance with aspects of the present disclosure.

In some examples, a wearable device (e.g., a ring) may be configured to collect physiological data from a user of the wearable device such that the user may monitor various aspects of their health. For example, the wearable device may collect heart rate data, sleep data, blood pressure data, etc. from the user. In order to collect physiological data from the user, the wearable device may include at least one optical transmitter and one optical receiver. The optical transmitter may transmit light through one or more layers of the user's tissue and the optical receiver may receive the light from the optical transmitter. The wearable device may analyze attributes (e.g., a signal strength) of the received light to determine the physiological data.

However, other characteristics of the user (e.g., a skin tone of the user, or other factors not contributing to the measured physiological data) may impact the absorption of light and may result in varying quality of physiological data. For example, the user's skin tone may contribute to the signal strength of the received light signals. For instance, darker skin tones may absorb more light as compared to lighter skin tones, which may affect the amount of light received at the photodetectors, and therefore affect the determined blood oxygen saturation metrics. As such, failing to account for varying skin tones may increase the inaccuracy of the physiological data collected using optical components.

In order to account for varying skin tone metrics and to compensate for noise from other sources, the wearable device may implement an automatic gain control (AGC) algorithm or component. The AGC component may selectively adjust a transmit power of the optical transmitter such that the light received by the optical receiver is within a range of values (e.g., a range of signal strength values). For example, using AGC, a wearable device may increase a power applied to a light-emitting component for a user with a darker skin tone to account for the higher absorption rate of the darker skin tone and to maintain a high signal quality. However, the AGC component may not function properly and the wearable device may be unable to validate functionality of the AGC component.

Accordingly, the aspects of the present disclosure are directed to a wearable device that is configured to estimate a skin tone of the user of the wearable device using a machine learning (ML) model. Varying skin tones may be associated with different light absorption rates, where darker skin tones absorb a higher proportion of light, and lighter skin tones absorb a lower proportion of light. As such, techniques described herein may estimate a user's skin tone by evaluating how much power is required for a light-emitting component to achieve some signal strength level at a light-receiving component. In other words, inputting a characteristic of received light (e.g., a signal strength) and a transmit power parameter of the transmitted light into an ML model may be used to estimate a user's skin tone. The estimated skin tone may be used to validate functionality of components and algorithms at the wearable device.

In some examples, using an optical transmitter and during a first time interval, the wearable device may transmit light associated with a first wavelength. During the first time interval, and using an optical receiver, the wearable device may generate a signal based on the received light. A signal strength of the signal received at the optical receiver may be within one or more signal strength bands. Further, the wearable device may identify one or more data set pairs based on the signal. The one or more data set pairs may include a signal strength band of the one or more signal strength bands and a transmit power parameter associated with the optical transmitter. In other words, a data set pair may include a signal strength band at the optical receiver, and a transmit power parameter of the optical transmitter that was used to achieve the respective signal strength band (e.g., data set pair={Signal Strength Band, Tx Power}).

Once the wearable device identifies the one or more data set pairs, the wearable device may input the one or more data set pairs into an ML model and the ML model may output a skin tone metric based on the one or more data set pairs. In this regard, the ML model may estimate the user's skin tone by evaluating what Tx power parameters at the optical transmitters were used to achieve corresponding signal strengths at the optical receivers. The wearable device may then perform one or more actions based on the skin tone metric. As one example of an action, the wearable device may transmit signaling to a server and the server may validate that algorithms used to determine physiological measurements are functioning properly across skin tones of users. Alternatively, the wearable device may validate or adjust functionality of components (e.g., the AGC component) of the wearable device based on the skin tone metric. For instance, the wearable device may adjust measurement parameters used by sensors (e.g., light-emitting components, light-receiving components) of the wearable device to collect physiological data based on the determined skin tone metric.

Aspects of the disclosure are initially described in the context of systems supporting physiological data collection from users via wearable devices. Aspects of the disclosure are further illustrated by and described with reference to apparatus diagrams, system diagrams, and flowcharts that relate to techniques for estimating skin tone using an ML model.

FIG. 1 illustrates an example of a system 100 that supports techniques for estimating skin tone using an ML model in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-a (User 1) may operate, or may be associated with, a wearable device 104-a (e.g., ring 104-a) and a user device 106-a that may operate as described herein. In this example, the user device 106-a associated with user 102-a may process/store physiological parameters measured by the ring 104-a. Comparatively, a second user 102-b (User 2) may be associated with a ring 104-b, a watch wearable device 104-c (e.g., watch 104-c), and a user device 106-b, where the user device 106-b associated with user 102-b may process/store physiological parameters measured by the ring 104-b and/or the watch 104-c. Moreover, an nth user 102-n (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect photoplethysmography (PPG) data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a ML classifier, where the ML classifier is configured to determine periods of time that the user 102-*a* is (or was) asleep. Moreover, the ML classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a ML classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for estimating skin tone of a user 102 using an ML model. To estimate a skin tone of the user 102, the wearable device 104 may utilize an LED and a photodetector that may be positioned along the inner-surface of the wearable device 104. The LED may be capable of transmitting different wavelengths of light. For example, the LED may transmit green light, red light, blue light, IR light, etc. Using the LED and during a first time interval, the wearable device 104 may transmit light through one or more layers of the user's tissue and the light may be received at the photodetector of the wearable device 104. Upon receiving the light at the photodetector, the wearable device 104 may determine a signal strength band for the received light. For the purposes of the present disclosure, the term "signal strength band" may be used to refer to a range of signal strength values at the photodetector. For example, a signal strength of light received at a photodetector may be measured on a scale between 1 and 10 units (milli-amps, milli-volts per watt, etc.), where signal strengths between 1 and 2 units fall into a first "signal strength band," signal strengths between 2 and 4 units fall into a second "signal strength band, etc.

Further, the wearable device 104 may determine a transmit power parameter used by the optical transmitter to transmit the light during the first time interval. Collectively, the signal strength band and the transmit power parameter may be known as a data set pair (e.g., data set pair for first time interval={Signal Strength Band 1, Tx Power 1}). The wearable device 104 may input the data set pair into an ML model and the ML model may output a skin tone metric for the user (e.g., a metric indicative of the skin tone of the user) based on the data set pair. The wearable device 104 may then utilize the skin tone metric to validate functionality of components and algorithms implemented by the wearable device 104, adjust measurement parameters used by the wearable device 104 to collect physiological data, or both.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
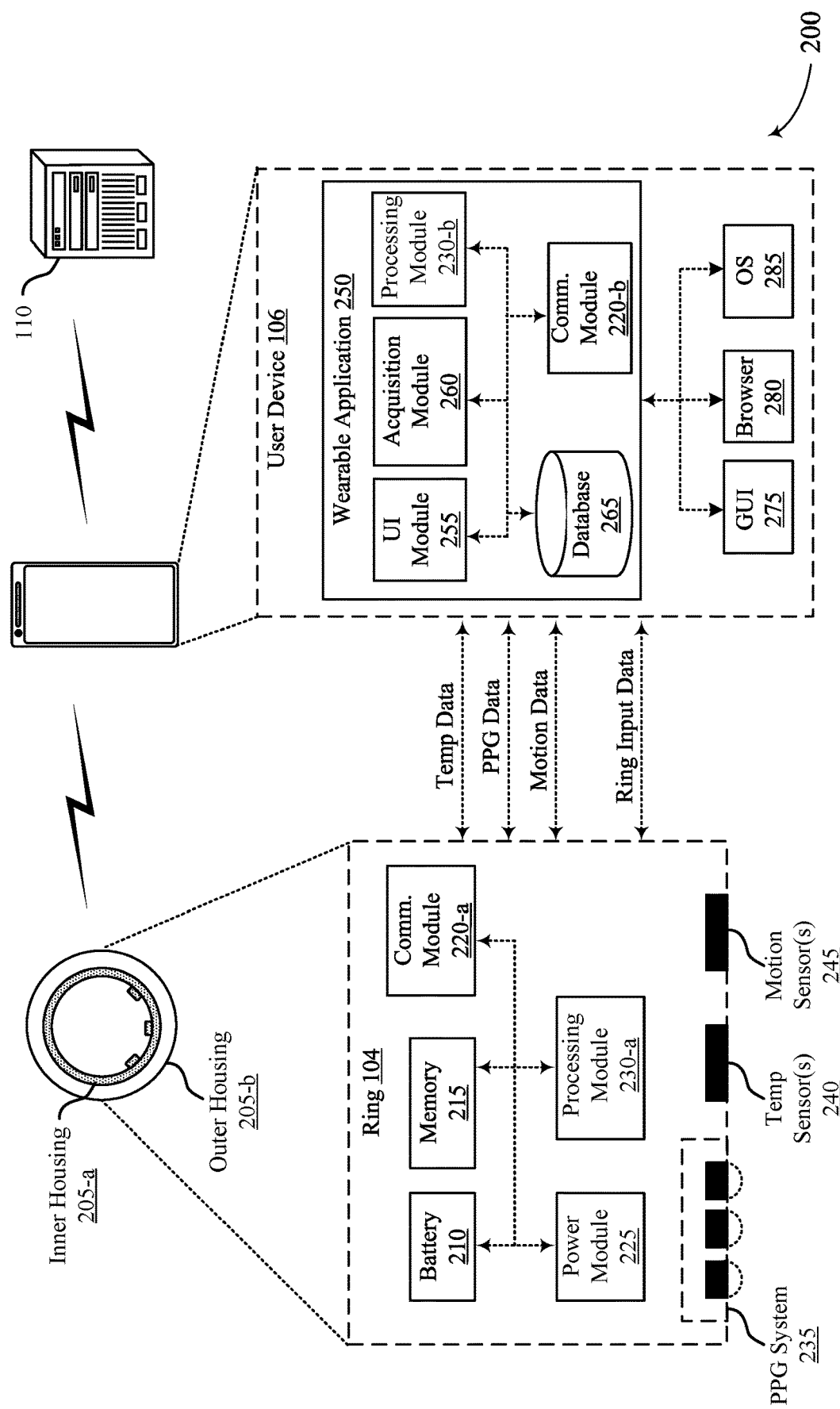
FIG. 2 illustrates an example of a system that supports techniques for estimating skin tone using an ML model in accordance with aspects of the present disclosure.

FIG. 2 illustrates an example of a system 200 that supports techniques for estimating skin tone using an ML model in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, PPG data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage (s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMl160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep day's may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for estimating a user's skin tone using an ML model. As described herein, the PPG system 235 may include an optical receiver and an optical transmitter. The optical transmitter may transmit light associated with a wavelength (e.g., green light, red light, IR light, etc.) and the optical receiver may receive the light from the optical transmitter. In particular, the optical transmitter may be configured to adjust a transmit power of the light such that a signal generated by the optical receiver is maintained within a signal strength band. Further, the ring 104 may determine the transmit power parameter of the optical transmitter that corresponds to the signal strength band and input both the signal strength band and the transmit power parameter into an ML model. Based on the signal strength band and the transmit power parameter inputted to the ML model, the ML model may output a skin tone metric of the user.

Figure 3:
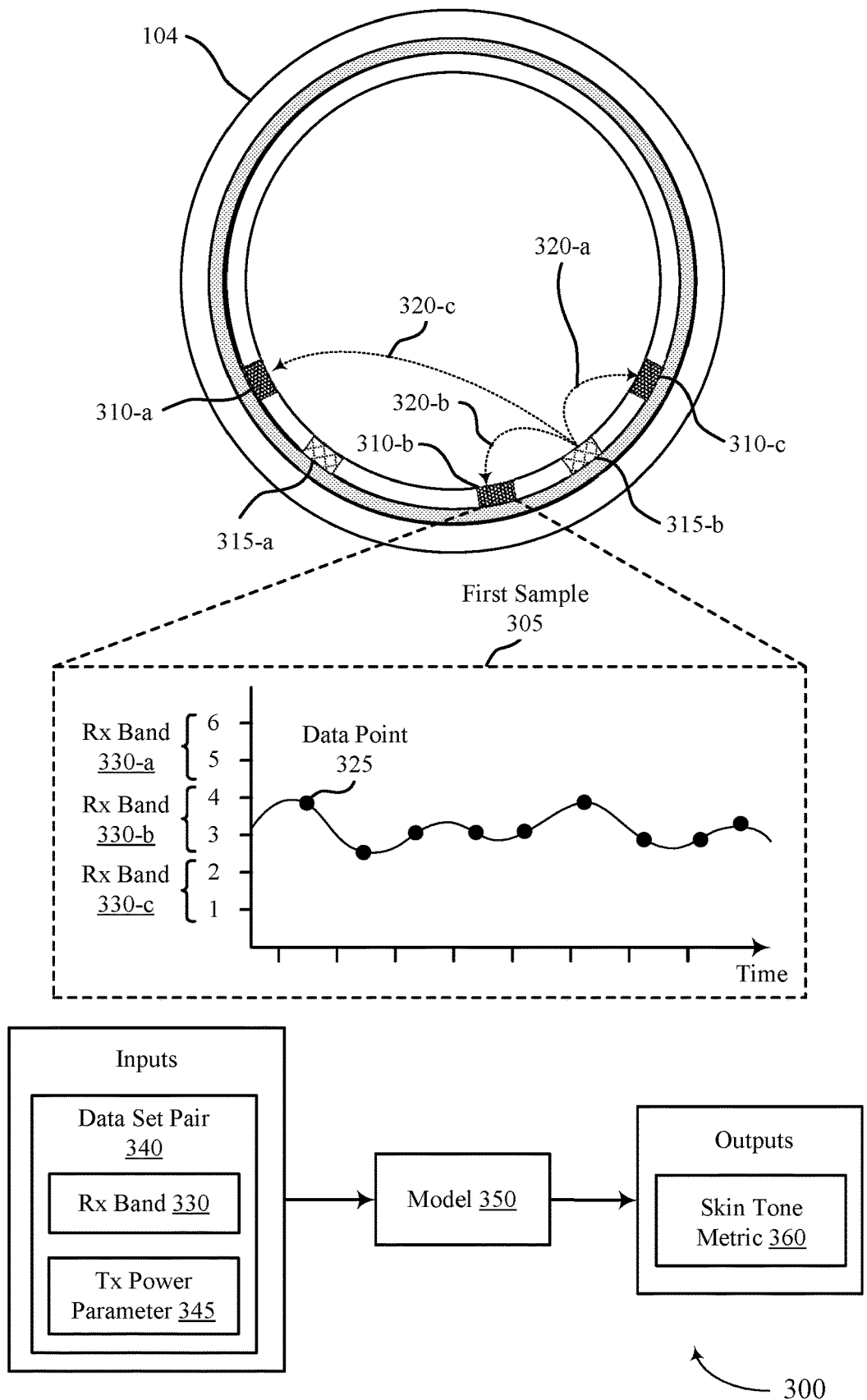
FIG. 3 shows an example of a system that supports techniques for estimating skin tone using an ML model in accordance with aspects of the present disclosure.

FIG. 3 shows an example of a system 300 that supports techniques for estimating skin tone using an ML model in accordance with aspects of the present disclosure. In some examples, the system 300 may implement, or be implemented by, aspects of the system 100, the system 200, or both. For example, the system 300 may include wearable device 104 which may be an example of a wearable device 104 and a ring 104 as described with reference to FIGS. 1 and 2, respectively.

As described with reference to FIG. 1, the wearable device 104 (or the ring 104) may be configured to collect PPG data from a user of the wearable device 104 and may include one or more components that may be used to the collect the PPG data. In the example of FIG. 3, the wearable device 104 may include one or more optical transmitters 315 (e.g., one or more light-emitting components, such as LEDs) and one or more optical receivers 310 (e.g., photodiodes, photodetectors) situated along an inner-housing of the wearable device 104. An optical transmitter 315 may transmit light and the one or more optical receivers 310 may receive the transmitted light along one or more optical channels 320. For example, the light may travel via an optical channel 320-a if light is transmitted from optical transmitter 315-b and received by optical receiver 310-c. Alternatively, the light may travel via an optical channel 320-b if the light is transmitted from optical transmitter 315-b and received by the optical receiver 310-b. Alternatively, the light may travel via an optical channel 320-c if the light is transmitted from the optical transmitter 315-b and received by the optical receiver 310-a.

Light that is transmitted and received via the optical channels 320 may go through one or more layers of the user's finger. As the light travels along optical channels 320, some of the light may be absorbed by the one or more layers of the user's finger, resulting in less light being received by the optical receiver 310 than what was transmitted by the optical transmitter 315. The optical receiver 310 (e.g., or components coupled to the optical receiver 310 such as a processing module) may analyze the received light (e.g., a signal strength of the received light) to determine PPG data of the user. PPG data may be used to calculate one or more physiological metrics, such as a heart rate of the user, an oxygen saturation level of the user, an HRV of the user, etc. However, in some examples, outside factors (e.g., factors not associated with the measured PPG data) may significantly affect the absorption of the light. An example of one of these factors may be a skin tone of the user of the wearable device 104.

A skin tone of the user may be described as an amount of melanin present in the top epidermal layers of the skin. The more melanin in the skin, the darker the skin tone of the user. Further, the more melanin in the skin, the more light that is absorbed. Because PPG data may rely on signal strength measurements of the received light, a variation in light absorption across users may result in less accurate PPG data for the users. That is, a common PPG algorithm will not yield accurate results across varying skin tones due to the differences in absorption across skin tones.

To account for variations in skin tone, the wearable device 104 may include or implement an AGC component or algorithm. The AGC component/algorithm may be configured to selectively adjust the transmit power of the optical transmitter 315 such that the light received by the optical receiver 310 falls with a range of values (e.g., a signal strength of the received light is maintained within a range of values). In other words, wearable devices 104 may implement AGC by adjusting transmit power metrics of optical transmitters 315 to achieve some desired, relatively constant signal strength at the optical receiver 310. Due to the face that the signal strength at the optical receiver 310 may be affected by the user's skin tone, AGC may make it such that a transmit power of optical transmitter 315 for a user with a darker skin tone is higher than a transmit power of an optical transmitter 315 for a user with a lighter skin tone. As a result, the received light in both cases may be within the same range. In other words, the AGC component may remove the outside factor of skin tone allowing for a same PPG algorithm to be applied across a wide range of user's in order to determine the users' PPG data.

In this regard, an AGC algorithm implemented by the wearable device may be used to help a quality of physiological data collected by the wearable device. Moreover, in accordance with some aspects of the present disclosure, signal strength values and corresponding transmit powers determined using ACG may be used to further estimate a skin tone of the user. Further, as will be described in further detail herein, aspects of the present disclosure may be used to determine a user's skin tone metric, which may be used to adjust or refine the AGC used by the wearable device 104 to collect physiological data from the user.

As described herein, the wearable device 104 may estimate the skin tone of the user in effort to validate the functionality of components of the wearable device 104 (e.g., the AGC component/algorithm). In some examples, the wearable device 104 may employ an optical transmitter 315 and optical receiver 310 pair (e.g., any of the pairs illustrated in FIG. 3). The optical transmitter 315 may transmit first light associated with a first wavelength (e.g., a wavelength corresponding to green light) and the optical receiver 310 may receive the transmitted first light. In some examples, the optical transmitter 315 and the optical receiver 310 may be active for a first time interval. During the first time interval, a signal strength of the first light received by optical receiver 310 may change. For example, as shown in a first sample 305, the received first light (e.g., a signal strength of the received light) may vary between a value of 2.5 and a value of 4. As described previously herein, the signal strength of the first light received by the optical receiver 310 may change as a result of an AGC algorithm configured to adjust a transmit power of the optical transmitter 315 in order to maintain the signal strength within some defined range (e.g., within a defined Rx band 330).

Upon receiving the light, the optical receiver 310 may analyze the received first light and generate a signal based on the received first light. During analysis, the optical receiver 310 (or a component coupled to the optical receiver 310) may determine which Rx band 330 (or signal strength band) of a set of Rx bands 330 that the received first light (or a strength of the signal) fits into. In the example of FIG. 3, the set of Rx bands 330 may include an Rx band 330-a that spans a value of 5 to a value of 6, an Rx band 330-b that spans a value of 3 to a value of 4, and an Rx band 330-c that spans a value of 1 to a value of 2. The optical receiver 310 may look at different data points 325 of the first sample 305 and utilize one or more statistical parameters of the data points 325 (e.g., a mean, a maximum, or a minimum of the data points 325) to determine which Rx band 330 the received first light fits into. As shown in the first sample 305 of FIG. 3, the optical receiver 310 may look at 9 different data points 325. The 9 data points 325 may have a value of 4, 2.5, 3, 3, 3, 4, 3, 3, and 3.5 and a mean value of the data points 325 may be 3.2, meaning that the average output of the optical receiver 310 during the first time interval was 3.2. As such, for the first time interval shown in the first sample 305, the optical receiver 310 may select the Rx band 330-b for the first sample 305 given that 3.2 falls in between 3 and 4.

Further, the optical receiver 310 may determine a corresponding first transmit power parameter 345 of the first sample 305. The corresponding first transmit power parameter 345 may be a transmit power used by the optical transmitter 315 to transmit the first light during the first time interval. Similar to determining the Rx band 330 of the sample 305, the optical receiver 310 may determine a corresponding transmit power for each of the data points 325 and utilize one or more statistical parameters of the transmit powers corresponding to the data points 325 (e.g., a mean, a maximum, a minimum, or a standard deviation of the transmit powers) to determine the first transmit power parameter 345 for the first time interval. Together, the first transmit power parameter 345 and the determined Rx band 330 of the sample may be collectively known as a first data set pair 340 (e.g., data set pair={Rx band, Tx power}, where the selected Rx band and/or Tx power may be determined using any statistical measure across the first time interval, such as average Rx band/Tx parameter, minimum or maximum Rx band/Tx parameter, etc.).

After determining the first data set pair 340 for the sample 305, the wearable device 104 may input the first data set pair 340 into a model 350 and the model 350 may output a skin tone metric 360 based on the first data set pair 340. In this regard, the model 350 may evaluate what transmit power(s) were used to achieve corresponding signal strengths in order to estimate the user's skin tone. In some examples, the output of the model 350 may be scaled according to a Fitzpatrick scale. That is, the skin tone metric 360 may be one of a value of 1, 2, 3, 4, 5, or, 6, where each value corresponds to a different skin tone (ranging from lighter to darker skin tones).

In some examples, the model 350 may be an example of an ML model. An ML model may be described as a collection of algorithms that may be trained to recognize patterns and make predictions based on the recognized patterns. The algorithms implemented in the ML model may be an example of a neural net, such as feed forward (FF), or deep feed forward (DFF) neural network, a recurrent neural network (RNN), a long/short term memory (LSTM) neural network, or any other type of neural network. However, any other algorithms may be supported by the wearable device 104. For example, the algorithm may implement a nearest neighbor algorithm, a linear regression algorithm, a Naïve Bayes algorithm, a random forest algorithm, or any other ML algorithm. Furthermore, the ML model may involve supervised learning, unsupervised learning, semi-supervised learning, reinforcement learning, or any combination thereof. In some examples, the wearable device 104 may utilize Adaboost to boost the performance of the ML model.

As described above, prior to implementation, the ML model 350 may be trained to determine weights of the algorithms such that the ML model 350 may map a desired input pattern to a desired output outcome. To train the ML model 350, the ML model 350 may be provided with a set of example inputs (e.g., example data set pairs 340 that are collected from users for which the skin tone is known) and a corresponding set of expected outputs (e.g., known skin tone metrics 360) to learn from. The example data set pairs 340 may be from different users (e.g., a sample set of users) for which a skin tone is known. As a result of the training, the ML model may learn that a larger difference (above a threshold) between the transmit power parameter 345 and the Rx band 330 of a data set pair 340 may result in a skin tone metric 360 indicative of a darker skin tone and a smaller difference (below the threshold) between the transmit power parameter 345 and the Rx band 330 of a data set pair 340 may result in a skin tone metric indicative of a lighter skin tone.

In some examples, more than one data set pair 340 may be input into the model 350 and the model 350 may collectively analyze the more than one data set pair 340 to determine the skin tone metric 360. A differentiating factor between the data set pairs 340 inputted into the model 350 may be a temporal difference, a difference in Rx bands 330, or a difference in wavelengths. In one example, after the first time interval and during a second time interval, the optical transmitter 315 may retransmit or continue to transmit the first light associated with the first wavelength and the optical receiver 310 may receive the transmitted first light resulting in a second sample 305 (e.g., different from the first sample 305). Upon receiving the first light, the optical receiver 310 may analyze the received light and determine which Rx band 330 (or signal strength band) of a set of Rx bands 330 that the received first light fits into. In some examples, the determined Rx band 330 may be different from the Rx band 330 from the first time interval. For example, the optical receiver 310 may determine the average of the light received during the second time interval fits into the Rx band 330-a. Further, the optical receiver 310 may determine a second transmit power parameter 345 that corresponds to the second sample 305. These two values (e.g., the Rx band 330-a and the second transmit power parameter 345) may be known as a second data set pair 340 and may be input into the model 350 along with the first data set pair 340 to determine the skin tone metric 360 (e.g., first data set pair 340 for first time interval={Rx band 1, Tx power 1}; second data set pair 340 for second time interval={Rx band 2, Tx power 2}).

Alternatively or additionally, during or after the first time interval (e.g., during a third time interval), the optical transmitter 315 may transmit second light associated with a second wavelength (e.g., wavelength associated with red light or IR light) and the optical receiver 310 may receive the transmitted second light resulting in a third sample 305 (e.g., different from the first sample 305). Upon receiving the second light, the optical receiver 310 may analyze the received second light and determine which Rx band 330 (or signal strength band) of a set of Rx bands 330 that the received second light fits into. The set of Rx bands 330 may be different from the Rx band 330-a, the Rx band 330-b, and the Rx band 330-c given that the transmitted second light is associated with a second wavelength as opposed to the first wavelength. Further, the optical receiver 310 may determine a third transmit power parameter 345 that corresponds to the third sample 305. These two values (e.g., the selected Rx band 330 and the third transmit power parameter 345) may be known as a third data set pair 340 and may be input into the model 350 along with one or both of the first data set pair 340 or the second data set pair 340 to determine the skin tone metric 360 (e.g., first data set pair 340 for green light={Rx band-G, Tx power-G}; second data set pair 340 for IR light={Rx band-IR, Tx power-IR}).

In some examples, factors other than skin tone can significantly affect the absorption of the light transmitted from the optical transmitter 315. For example, a size of the wearable device 104 may affect the absorption of the transmitted light. A wearable device 104 with a larger ring size may result in a greater distance between the optical transmitter 315 and the optical receiver 310 when compared to a wearable device 104 with a smaller ring size. Light that travels a larger difference may be associated with more absorption than light that travels a shorter distance. To account for the ring size of wearable device 104, the ring size (or a distance between optical transmitter 315 and the optical receiver 310) of the wearable device 104 along with the one or more data set pairs 340 may be input into the model 350 to determine the skin tone metric 360. In other words, the model 350 may be trained on different sized wearable devices to determine skin tone metrics 360 of users associated with wearable devices of varying size.

Other factors that may affect the light received by the optical receiver 310 may be ambient light and movement. Ambient light may be described as any light not produced by the optical transmitter 315. To mitigate the effects of the ambient light and movement, the wearable device 104 may perform measurements (e.g., collect the samples 305/data set pairs 340) while the user of the wearable device 104 is asleep. When the user is asleep, the ambient lighting and movement of the user may be minimal. The wearable device 104 may determine when the user is asleep using sleep metrics and various other methods as described with reference to FIG. 2.

In another example, characteristics of these factors may trigger the optical transmitter 315 for the purpose of the skin tone measurement. For example, the wearable device 104 may acquire motion data from the user, and if motion data of the user falls below a threshold (e.g., fails to satisfy the threshold), the optical transmitter 315 may transmit the first light in order to collect the first sample 305. In another example, the optical transmitter 315 may transmit light when the ambient light falls below a threshold. In some examples, the motion data and the ambient light may fall below a threshold during a time period that the user is asleep.

Upon determining the skin tone metric 360 of the user, the wearable device 104 may perform one or more actions. In one action, the wearable device 104 may utilize the skin tone metric 360 to validate functionality of algorithms (e.g., AGC algorithms) of the wearable device 104 across different skin tones. In such examples, the wearable device 104 may transmit signaling indicating the skin tone metric 360 to a user device associated with the wearable device 104 and the user device may transfer the skin tone metric 360 to a server. The server may receive skin tone metrics 360 of multiple users of varying skin tones and analyze whether algorithms of the wearable devices 104 are working properly across multiple skin tones. In one example, the server may detect an anomaly or an error in the algorithm for a portion of the users. If the commonality between the users is the skin tone metrics (e.g., all of the users experiencing the anomaly have the same skin tone), this may indicate that the algorithm is not working properly for that particular skin tone.

Another action the wearable device 104 may take is to adjust one or more measurement parameters of the wearable device 104 based on the skin tone metric 360. For example, the skin tone metric 360 may indicate that the skin tone of the user is a value of 1 on the Fitzpatrick's scale. A value of 1 may indicate that the skin tone of the user is very fair and may absorb less light when compared to a user with a Fitzpatrick score of 2, 3, 4, 5, or 6. However, the AGC component of the wearable device 104 of the user may increase the transmit power of the optical transmitter 315 by an amount that is similar to users with a Fitzpatrick score of 2, 3, 4, 5, or 6. This may indicate that the AGC component is faulty and the desired range of values of the received light is not being met.

Due to this discrepancy between the skin tone and the AGC component, the wearable device 104 may adjust one or more measurement parameters of the wearable device 104. As one example, the wearable device 104 may recalibrate the AGC component. In another example, the wearable device 104 may decrease or increase a power level of the optical transmitter 315, increase or decrease a burn time associated with the optical transmitter 315, or adjust an algorithm for analyzing the light received by the optical receiver 310. Once the one or more measurements parameters are adjusted, the wearable device 104 may perform PPG measurements for the user using the adjusted or determined measurement parameters.

In some cases, adjusting measurement parameters of the wearable device 104 (e.g., adjusting an AGC algorithm) may be performed to account for changing skin tones of the user, such as due to the user tanning, due to birth marks or freckles, etc. For example, a user may exhibit a lighter skin tone in the winter, and a darker skin tone in the summer as they are exposed to the sun. In this example, the wearable device 104 may identify the changing skin tone, and may adjust measurement parameters accordingly in order to collect high quality physiological data with the darker skin tone. Similarly, if the wearable device is moved from one location to another (e.g., from one wrist to another, or one finger to another), the new location may exhibit a different skin tone as compared to the original location, such as due to a birthmark, a mole or freckle, a scar, etc. In such cases, aspects of the present disclosure may be used to identify the different skin tone metric, and adjust measurement parameters accordingly to account for the different skin tone metric.

Another action that the wearable device 104 may take in response to the estimated skin tone may be to determine an orientation of the wearable device 104. In some examples, the wearable device 104 may determine a baseline skin tone metric 360 associated with the user. The baseline skin tone metric 360 for the user may be a skin tone metric 360 that was determined for the user prior to the first skin tone metric 360 (e.g., during a time interval prior to the first time interval). The wearable device 104 may compare the baseline skin tone metric 360 to the first skin tone metric 360 and determine if there is a difference. In some examples, positioning the one or more optical transmitters 315 and the one or more optical receivers 310 near the underside of the user's finger may result in more accurate PPG data. The underside of the finger may be lighter than the topside of the finger. Thus, if the baseline skin tone metric 360 is indicative of a lighter skin tone than the first skin tone metric 360, the orientation of the wearable device 104 may have changed such that the one or more optical transmitters 315 and the one or more optical receivers 310 are near the topside of the user's finger.

In such cases, to ensure accurate PPG data, the wearable device 104 may generate, via a user device associated with the wearable device 104, an instruction for the user to adjust the orientation of the wearable device 104 such that the one or more optical transmitters 315 and the one or more optical receivers 310 are in contact with underside of the user's finger. In another example, the wearable device 104 may selectively adjust an activation state of associated with the wearable device more optical transmitters 315 and the one or more optical receivers 310 based on the determined orientation (e.g., selectively activate sensors on the palm-side of the user's finger, and selectively deactivate sensors on the back-side of the user's finger).

Figure 4:
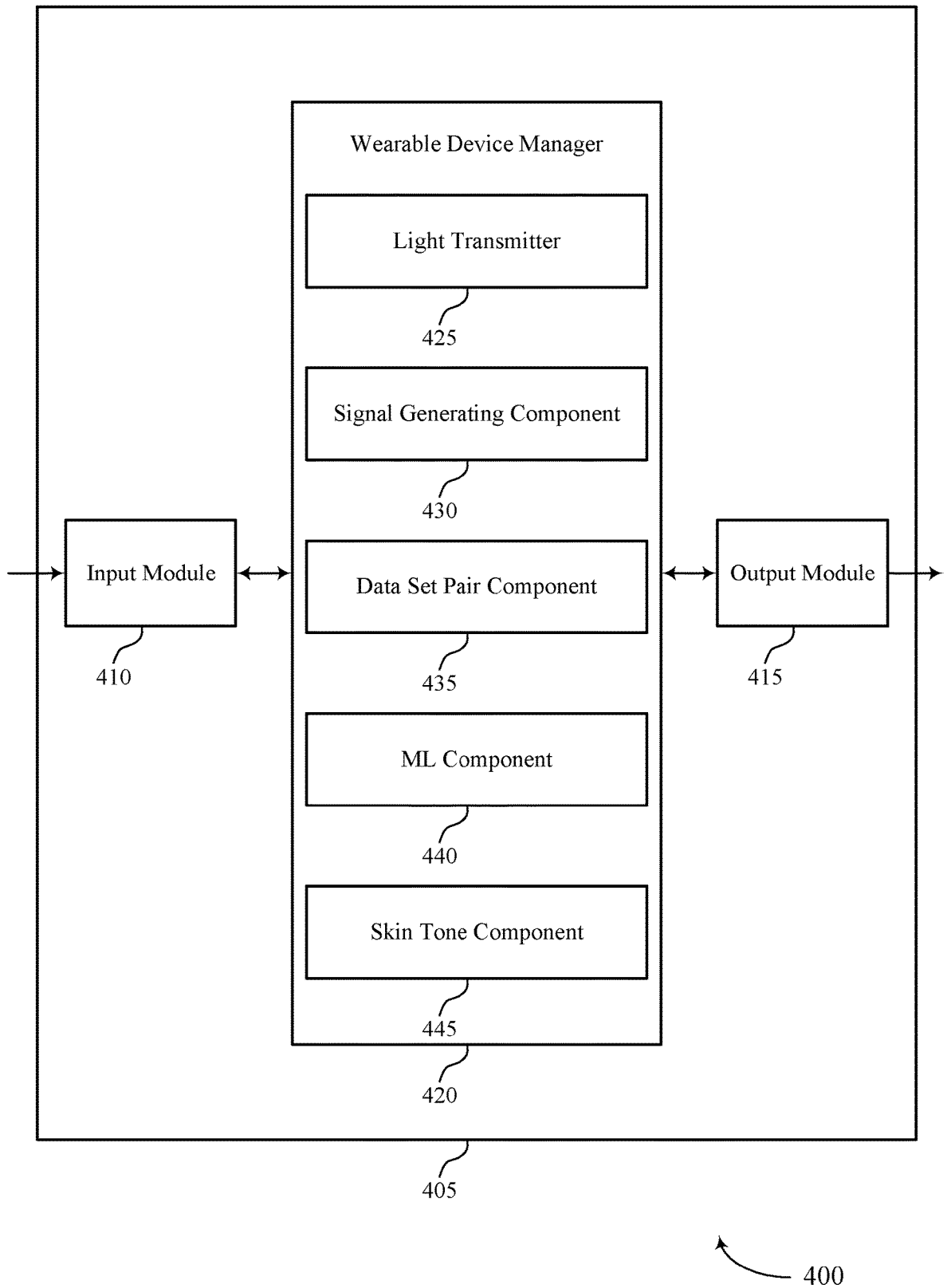
FIG. 4 shows a block diagram of an apparatus that supports techniques for estimating skin tone using an ML model in accordance with aspects of the present disclosure.

FIG. 4 shows a block diagram 400 of a device 405 that supports techniques for estimating skin tone using an ML model in accordance with aspects of the present disclosure. The device 405 may include an input module 410, an output module 415, and a wearable device manager 420. The device 405 may also include a processor. Each of these components may be in communication with one another (e.g., via one or more buses).

For example, the wearable device manager 420 may include a light transmitter 425, a signal generating component 430, a data set pair component 435, an ML component 440, a skin tone component 445, or any combination thereof. In some examples, the wearable device manager 420, or various components thereof, may be configured to perform various operations (e.g., receiving, monitoring, transmitting) using or otherwise in cooperation with the input module 410, the output module 415, or both. For example, the wearable device manager 420 may receive information from the input module 410, send information to the output module 415, or be integrated in combination with the input module 410, the output module 415, or both to receive information, transmit information, or perform various other operations as described herein.

The wearable device manager 420 may support estimating skin tone associated with a user in accordance with examples as disclosed herein. The light transmitter 425 may be configured as or otherwise support a means for transmitting light associated with a first wavelength using one or more light-emitting components of a wearable device associated with the user. The signal generating component 430 may be configured as or otherwise support a means for generating a signal based at least in part on the light received at one or more photodetectors of the wearable device, wherein a strength of the signal received at the one or more photodetectors is maintained within one or more signal strength bands throughout one or more time intervals. The data set pair component 435 may be configured as or otherwise support a means for identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals. The ML component 440 may be configured as or otherwise support a means for inputting the one or more data set pairs into an ML model. The skin tone component 445 may be configured as or otherwise support a means for determining a skin tone metric associated with the user based at least in part on inputting the one or more data set pairs into the ML model.

Figure 5:
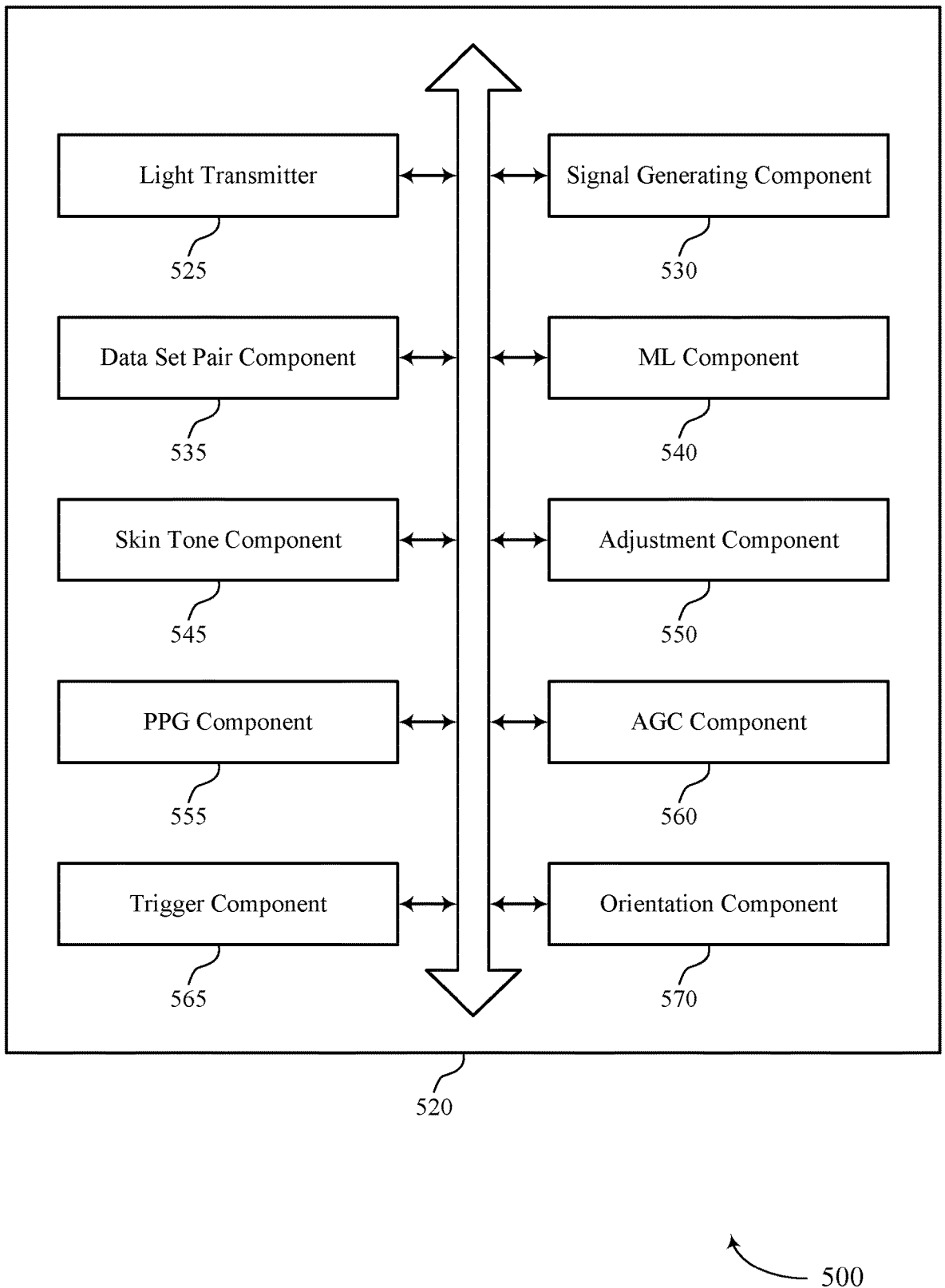
FIG. 5 shows a block diagram of a wearable device manager that supports techniques for estimating skin tone using an ML model in accordance with aspects of the present disclosure.

FIG. 5 shows a block diagram 500 of a wearable device manager 520 that supports techniques for estimating skin tone using an ML model in accordance with aspects of the present disclosure. The wearable device manager 520 may be an example of aspects of a wearable device manager or a wearable device manager 420, or both, as described herein. The wearable device manager 520, or various components thereof, may be an example of means for performing various aspects of techniques for estimating skin tone using an ML model as described herein. For example, the wearable device manager 520 may include a light transmitter 525, a signal generating component 530, a data set pair component 535, an ML component 540, a skin tone component 545, an adjustment component 550, a PPG component 555, an AGC component 560, a trigger component 565, an orientation component 570, or any combination thereof. Each of these components may communicate, directly or indirectly, with one another (e.g., via one or more buses).

The wearable device manager 520 may support estimating skin tone associated with a user in accordance with examples as disclosed herein. The light transmitter 525 may be configured as or otherwise support a means for transmitting light associated with a first wavelength using one or more light-emitting components of a wearable device associated with the user. The signal generating component 530 may be configured as or otherwise support a means for generating a signal based at least in part on the light received at one or more photodetectors of the wearable device, wherein a strength of the signal received at the one or more photodetectors is maintained within one or more signal strength bands throughout one or more time intervals. The data set pair component 535 may be configured as or otherwise support a means for identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals. The ML component 540 may be configured as or otherwise support a means for inputting the one or more data set pairs into an ML model. The skin tone component 545 may be configured as or otherwise support a means for determining a skin tone metric associated with the user based at least in part on inputting the one or more data set pairs into the ML model.

In some examples, the light transmitter 525 may be configured as or otherwise support a means for transmitting second light associated with a second wavelength using the one or more light-emitting components of the wearable device. In some examples, the signal generating component 530 may be configured as or otherwise support a means for generating a second signal based at least in part on the second light received at the one or more photodetectors, wherein a strength of the second signal received at the one or more photodetectors is maintained within one or more additional signal strength bands throughout one or more additional time intervals. In some examples, the data set pair component 535 may be configured as or otherwise support a means for identifying one or more additional data set pairs based at least in part on the second signal, wherein the one or more additional data set pairs comprise a second signal strength band of the one or more additional signal strength bands and a second transmit power parameter of the one or more light-emitting components that corresponds to the second signal strength band during a respective additional time interval of the one or more additional time intervals. In some examples, the ML component 540 may be configured as or otherwise support a means for inputting the one or more additional data set pairs into the ML model, wherein determining the skin tone metric is based at least in part on inputting the one or more additional data set pairs into the ML model.

In some examples, the one or more data set pairs comprise a first data set pair associated with a first time interval and a second data set pair associated with a second time interval. In some examples, the first data set pair comprises a first signal strength band of the signal during the first time interval and a first transmit power parameter used during the first time interval. In some examples, the second data set pair comprises a second signal strength band of the signal during the second time interval and a second transmit power parameter used during the second time interval.

In some examples, the ML component 540 may be configured as or otherwise support a means for inputting, to the ML model, one or more additional data set pairs associated with one or more additional users, wherein the one or more additional data set pairs comprise pairs of additional signal strength bands and corresponding additional transmit power parameters associated with additional wearable devices of the one or more additional users, wherein determining the skin tone metric is based at least in part on inputting the one or more additional data set pairs to the ML model.

In some examples, the adjustment component 550 may be configured as or otherwise support a means for determining one or more measurement parameters associated with the user, the wearable device, or both, based at least in part on the skin tone metric. In some examples, the PPG component 555 may be configured as or otherwise support a means for acquiring physiological data from the user via the wearable device based at least in part on the one or more measurement parameters.

In some examples, the one or more measurement parameters comprise a power level associated with the one or more light-emitting components, a burn time associated with the one or more light-emitting components, an algorithm for analyzing the light received by the one or more photodetectors, or any combination thereof.

In some examples, the AGC component 560 may be configured as or otherwise support a means for selectively adjusting one or more transmit power parameters of the one or more light-emitting components to maintain the strength of the signal received at the one or more photodetectors within the one or more signal strength bands, wherein identifying the one or more data set pairs is based at least in part on selectively adjusting the one or more transmit power parameters.

In some examples, the trigger component 565 may be configured as or otherwise support a means for acquiring physiological data from the user via the wearable device, the physiological data comprising motion data. In some examples, the trigger component 565 may be configured as or otherwise support a means for identifying a satisfaction of a trigger condition for determining the skin tone metric based at least in part on the motion data failing to satisfy a threshold level of motion, wherein transmitting the light, generating the signal, identifying the one or more data set pairs, and determining the skin tone metric is based at least in part on identifying the satisfaction of the trigger condition.

In some examples, the trigger component 565 may be configured as or otherwise support a means for identifying the satisfaction of the trigger condition based at least in part on the motion data failing to satisfy the threshold level of motion during a time period that the user is asleep, during a time period that an ambient light level is less than some threshold level of ambient light, or both.

In some examples, the ML component 540 may be configured as or otherwise support a means for inputting, to the ML model, an indication of one or more distances between the one or more light-emitting components and the one or more photodetectors, wherein determining the skin tone metric is based at least in part on the indication of the one or more distances.

In some examples, the indication of the one or more distances comprises a size of the wearable device. In some examples, the transmit power parameter of the one or more data set pairs comprises one or more statistical parameters associated with a current that is provided to the one or more light-emitting components to generate the corresponding signal strength band.

In some examples, the orientation component 570 may be configured as or otherwise support a means for determining a baseline skin tone metric associated with the user based at least in part on additional light transmitted by the one or more light-emitting components and received by the one or more photodetectors. In some examples, the orientation component 570 may be configured as or otherwise support a means for determining an orientation of the wearable device relative to the user based at least in part on a comparison between the skin tone metric and the baseline skin tone metric.

In some examples, the orientation component 570 may be configured as or otherwise support a means for selectively adjusting an activation state of one or more sensors associated with the wearable device based at least in part on the orientation, wherein the one or more sensors comprise the one or more light-emitting components, the one or more photodetectors, additional sensors, or any combination thereof. In some examples, the PPG component 555 may be configured as or otherwise support a means for acquiring physiological data associated with the user via the wearable device based at least in part on selectively adjusting the activation state of the one or more sensors.

In some examples, the orientation component 570 may be configured as or otherwise support a means for generating, via the wearable device, a user device associated with the wearable device, or both, an instruction for the user to adjust the orientation of the wearable device. In some examples, the skin tone metric comprises a Fitzpatrick scale metric. In some examples, the wearable device comprises a wearable ring device.

Figure 6:
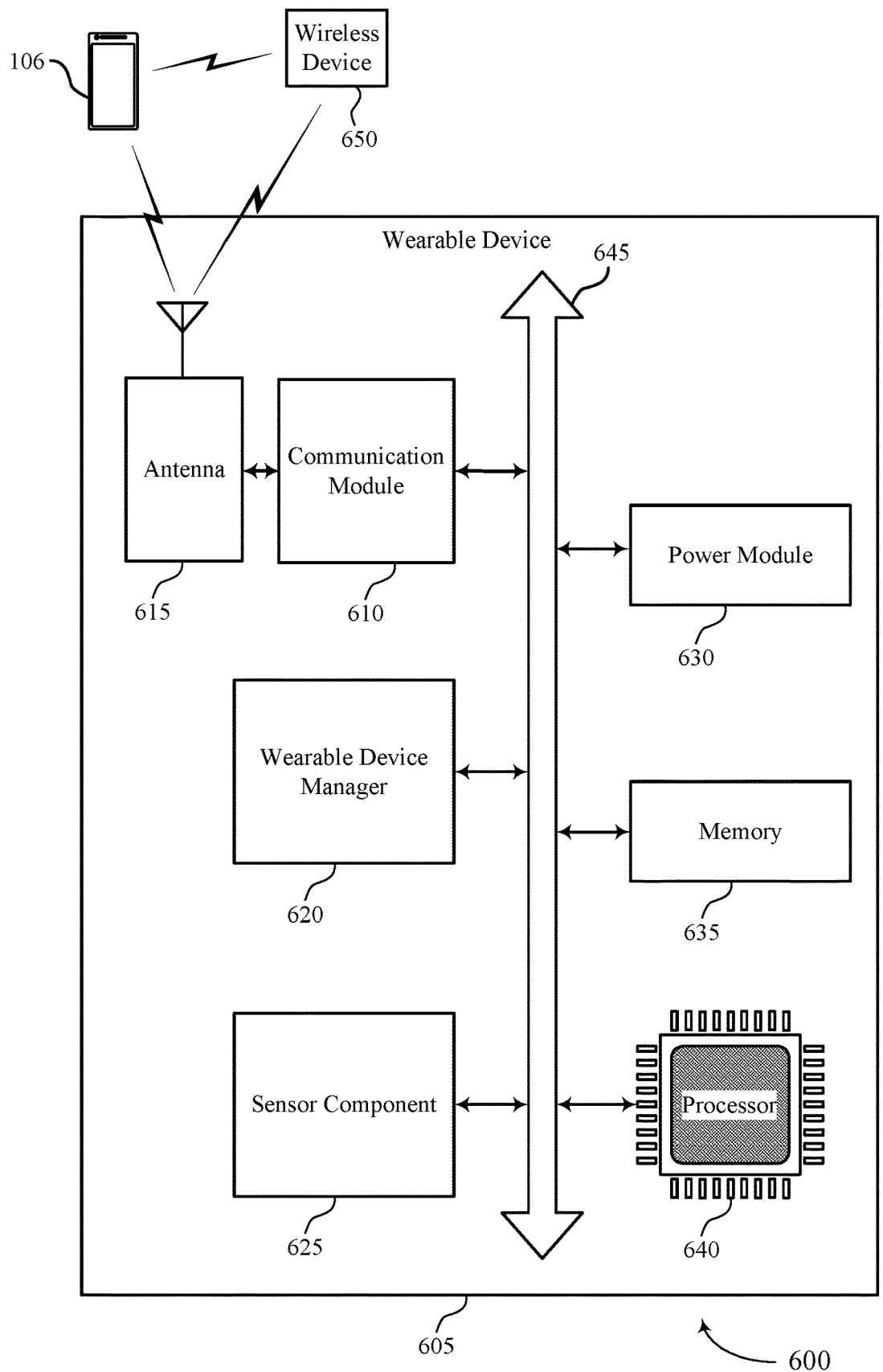
FIG. 6 shows a diagram of a system including a device that supports techniques for estimating skin tone using an ML model in accordance with aspects of the present disclosure.

FIG. 6 shows a diagram of a system 600 including a device 605 that supports techniques for estimating skin tone using an ML model in accordance with aspects of the present disclosure. The device 605 may be an example of or include the components of a device 405 as described herein. The device 605 may include an example of a wearable device 104, as described previously herein. The device 605 may include components for bi-directional communications including components for transmitting and receiving communications with a user device 106 and a server 110, such as a wearable device manager 620, a communication module 610, an antenna 615, a sensor component 625, a power module 630, a memory 635, a processor 640, and a wireless device 650. These components may be in electronic communication or otherwise coupled (e.g., operatively, communicatively, functionally, electronically, electrically) via one or more buses (e.g., a bus 645).

The wearable device manager 620 may support estimating skin tone associated with a user in accordance with examples as disclosed herein. For example, the wearable device manager 620 may be configured as or otherwise support a means for transmitting light associated with a first wavelength using one or more light-emitting components of a wearable device associated with the user. The wearable device manager 620 may be configured as or otherwise support a means for generating a signal based at least in part on the light received at one or more photodetectors of the wearable device, wherein a strength of the signal received at the one or more photodetectors is maintained within one or more signal strength bands throughout one or more time intervals. The wearable device manager 620 may be configured as or otherwise support a means for identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals. The wearable device manager 620 may be configured as or otherwise support a means for inputting the one or more data set pairs into an ML model. The wearable device manager 620 may be configured as or otherwise support a means for determining a skin tone metric associated with the user based at least in part on inputting the one or more data set pairs into the ML model.

By including or configuring the wearable device manager 620 in accordance with examples as described herein, the device 605 may support techniques for validating functionality of algorithms performed by a wearable device to determine physiological data for the user by estimating a skin tone metric of the user ensuring accurate physiological data.

Figure 7:
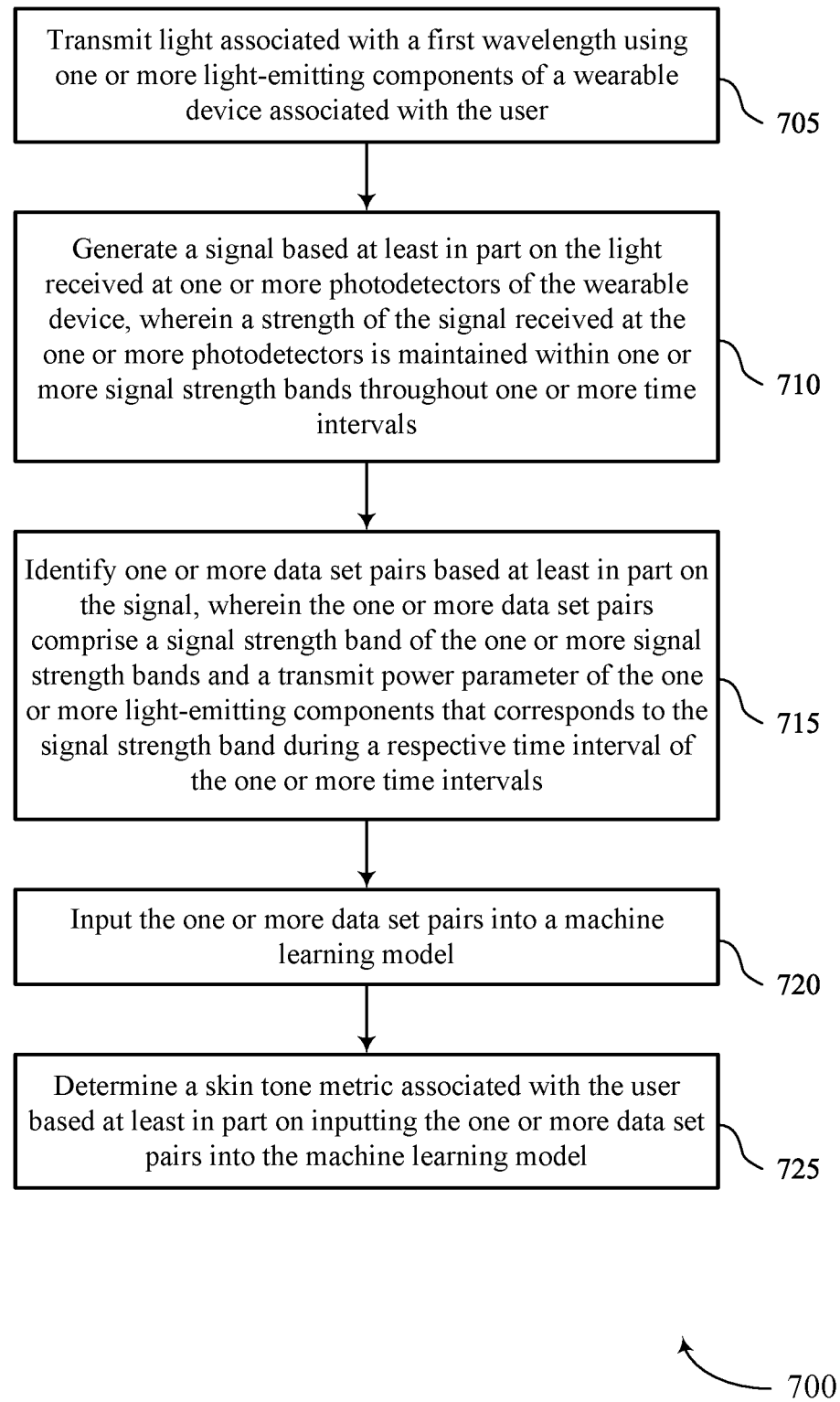
FIGS. 7 and 8 show flowcharts illustrating methods that support techniques for estimating skin tone using an ML model in accordance with aspects of the present disclosure.

FIG. 7 shows a flowchart illustrating a method 700 that supports techniques for estimating skin tone using an ML model in accordance with aspects of the present disclosure. The operations of the method 700 may be implemented by a wearable device or its components as described herein. For example, the operations of the method 700 may be performed by a wearable device as described with reference to FIGS. 1 through 6. In some examples, a wearable device may execute a set of instructions to control the functional elements of the wearable device to perform the described functions. Additionally, or alternatively, the wearable device may perform aspects of the described functions using special-purpose hardware.

At 705, the method may include transmitting light associated with a first wavelength using one or more light-emitting components of a wearable device associated with the user. The operations of 705 may be performed in accordance with examples as disclosed herein. In some examples, aspects of the operations of 705 may be performed by a light transmitter 525 as described with reference to FIG. 5.

At 710, the method may include generating a signal based at least in part on the light received at one or more photodetectors of the wearable device, wherein a strength of the signal received at the one or more photodetectors is maintained within one or more signal strength bands throughout one or more time intervals. The operations of 710 may be performed in accordance with examples as disclosed herein. In some examples, aspects of the operations of 710 may be performed by a signal generating component 530 as described with reference to FIG. 5.

At 715, the method may include identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals. The operations of 715 may be performed in accordance with examples as disclosed herein. In some examples, aspects of the operations of 715 may be performed by a data set pair component 535 as described with reference to FIG. 5.

At 720, the method may include inputting the one or more data set pairs into an ML model. The operations of 720 may be performed in accordance with examples as disclosed herein. In some examples, aspects of the operations of 720 may be performed by an ML component 540 as described with reference to FIG. 5.

At 725, the method may include determining a skin tone metric associated with the user based at least in part on inputting the one or more data set pairs into the ML model. The operations of 725 may be performed in accordance with examples as disclosed herein. In some examples, aspects of the operations of 725 may be performed by a skin tone component 545 as described with reference to FIG. 5.

Figure 8:
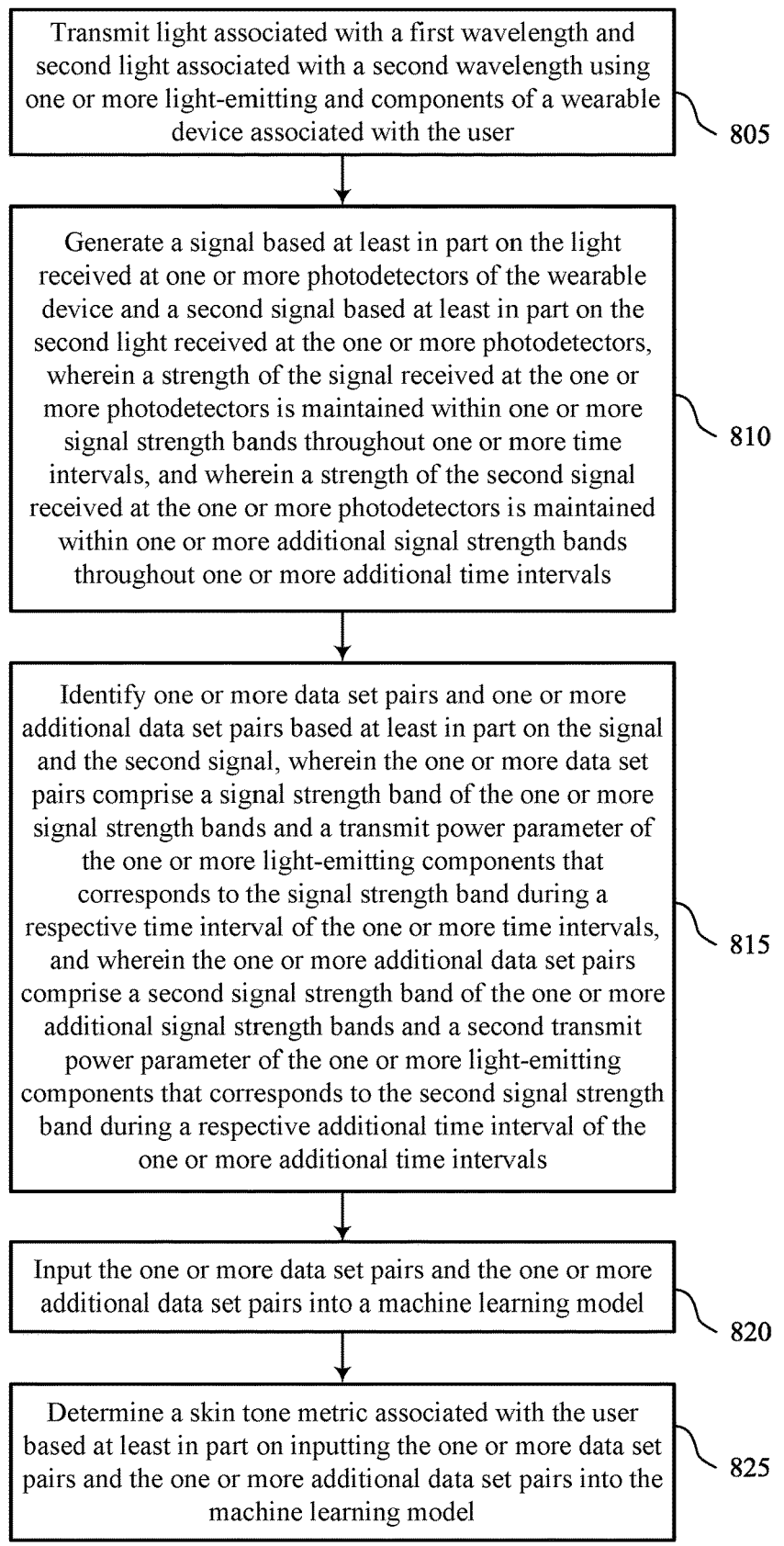

FIG. 8 shows a flowchart illustrating a method 800 that supports techniques for estimating skin tone using an ML model in accordance with aspects of the present disclosure. The operations of the method 800 may be implemented by a wearable device or its components as described herein. For example, the operations of the method 800 may be performed by a wearable device as described with reference to FIGS. 1 through 6. In some examples, a wearable device may execute a set of instructions to control the functional elements of the wearable device to perform the described functions. Additionally, or alternatively, the wearable device may perform aspects of the described functions using special-purpose hardware.

At 805, the method may include transmitting light associated with a first wavelength and a second light associated with a second wavelength using one or more light-emitting components of a wearable device associated with the user. The operations of 805 may be performed in accordance with examples as disclosed herein. In some examples, aspects of the operations of 805 may be performed by a light transmitter 525 as described with reference to FIG. 5.

At 810, the method may include generating a signal based at least in part on the light received at one or more photodetectors of the wearable device and a second signal based at least in part on the second light received at the one or more photodetectors, wherein a strength of the signal received at the one or more photodetectors is maintained within one or more signal strength bands throughout one or more time intervals, and wherein a strength of the second signal received at the one or more photodetectors is maintained within one or more additional signal strength bands throughout one or more additional time intervals. The operations of 810 may be performed in accordance with examples as disclosed herein. In some examples, aspects of the operations of 810 may be performed by a signal generating component 530 as described with reference to FIG. 5.

At 815, the method may include identifying one or more data set pairs and one or more additional data set pairs based at least in part on the signal and the second signal, wherein the one or more data set pairs comprise a signal strength band of the one or more signal strength bands and a transmit power parameter of the one or more light-emitting components that corresponds to the signal strength band during a respective time interval of the one or more time intervals, and wherein the one or more additional data set pairs comprise a second signal strength band of the one or more additional signal strength bands and a second transmit power parameter of the one or more light-emitting components that corresponds to the second signal strength band during a respective additional time interval of the one or more additional time intervals. The operations of 815 may be performed in accordance with examples as disclosed herein. In some examples, aspects of the operations of 815 may be performed by a data set pair component 535 as described with reference to FIG. 5.

At 820, the method may include inputting the one or more data set pairs and the one or more additional data set pairs into an ML model. The operations of 820 may be performed in accordance with examples as disclosed herein. In some examples, aspects of the operations of 820 may be performed by an ML component 540 as described with reference to FIG. 5.

At 825, the method may include determining a skin tone metric associated with the user based at least in part on inputting the one or more data set pairs and the one or more additional data set pairs into the ML model. The operations of 825 may be performed in accordance with examples as disclosed herein. In some examples, aspects of the operations of 825 may be performed by a skin tone component 545 as described with reference to FIG. 5.

It should be noted that the methods described above describe possible implementations, and that the operations and the steps may be rearranged or otherwise modified and that other implementations are possible. Furthermore, aspects from two or more of the methods may be combined.

A method for estimating skin tone associated with a user is described. The method may include transmitting light associated with a first wavelength using one or more light-emitting components of a wearable device associated with the user, generating a signal based at least in part on the light received at one or more photodetectors of the wearable device, wherein a strength of the signal received at the one or more photodetectors is maintained within one or more signal strength bands throughout one or more time intervals, identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals, inputting the one or more data set pairs into an ML model, and determining a skin tone metric associated with the user based at least in part on inputting the one or more data set pairs into the ML model.

An apparatus for estimating skin tone associated with a user is described. The apparatus may include a processor, memory coupled with the processor, and instructions stored in the memory. The instructions may be executable by the processor to cause the apparatus to transmit light associated with a first wavelength using one or more light-emitting components of a wearable device associated with the user, generate a signal based at least in part on the light received at one or more photodetectors of the wearable device, wherein a strength of the signal received at the one or more photodetectors is maintained within one or more signal strength bands throughout one or more time intervals, identify one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals, input the one or more data set pairs into an ML model, and determine a skin tone metric associated with the user based at least in part on inputting the one or more data set pairs into the ML model.

Another apparatus for estimating skin tone associated with a user is described. The apparatus may include means for transmitting light associated with a first wavelength using one or more light-emitting components of a wearable device associated with the user, means for generating a signal based at least in part on the light received at one or more photodetectors of the wearable device, wherein a strength of the signal received at the one or more photodetectors is maintained within one or more signal strength bands throughout one or more time intervals, means for identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals, means for inputting the one or more data set pairs into an ML model, and means for determining a skin tone metric associated with the user based at least in part on inputting the one or more data set pairs into the ML model.

A non-transitory computer-readable medium storing code for estimating skin tone associated with a user is described. The code may include instructions executable by a processor to transmit light associated with a first wavelength using one or more light-emitting components of a wearable device associated with the user, generate a signal based at least in part on the light received at one or more photodetectors of the wearable device, wherein a strength of the signal received at the one or more photodetectors is maintained within one or more signal strength bands throughout one or more time intervals, identify one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals, input the one or more data set pairs into an ML model, and determine a skin tone metric associated with the user based at least in part on inputting the one or more data set pairs into the ML model.

Some examples of the method, apparatuses, and non-transitory computer-readable medium described herein may further include operations, features, means, or instructions for transmitting second light associated with a second wavelength using the one or more light-emitting components of the wearable device, generating a second signal based at least in part on the second light received at the one or more photodetectors, wherein a strength of the second signal received at the one or more photodetectors may be maintained within one or more additional signal strength bands throughout one or more additional time intervals, identifying one or more additional data set pairs based at least in part on the second signal, wherein the one or more additional data set pairs comprise a second signal strength band of the one or more additional signal strength bands and a second transmit power parameter of the one or more light-emitting components that corresponds to the second signal strength band during a respective additional time interval of the one or more additional time intervals, and inputting the one or more additional data set pairs into the ML model, wherein determining the skin tone metric may be based at least in part on inputting the one or more additional data set pairs into the ML model.

In some examples of the method, apparatuses, and non-transitory computer-readable medium described herein, the one or more data set pairs comprise a first data set pair associated with a first time interval and a second data set pair associated with a second time interval, the first data set pair comprises a first signal strength band of the signal during the first time interval and a first transmit power parameter used during the first time interval, and the second data set pair comprises a second signal strength band of the signal during the second time interval and a second transmit power parameter used during the second time interval.

Some examples of the method, apparatuses, and non-transitory computer-readable medium described herein may further include operations, features, means, or instructions for inputting, to the ML model, one or more additional data set pairs associated with one or more additional users, wherein the one or more additional data set pairs comprise pairs of additional signal strength bands and corresponding additional transmit power parameters associated with additional wearable devices of the one or more additional users, wherein determining the skin tone metric may be based at least in part on inputting the one or more additional data set pairs to the ML model.

Some examples of the method, apparatuses, and non-transitory computer-readable medium described herein may further include operations, features, means, or instructions for determining one or more measurement parameters associated with the user, the wearable device, or both, based at least in part on the skin tone metric and acquiring physiological data from the user via the wearable device based at least in part on the one or more measurement parameters.

In some examples of the method, apparatuses, and non-transitory computer-readable medium described herein, the one or more measurement parameters comprise a power level associated with the one or more light-emitting components, a burn time associated with the one or more light-emitting components, an algorithm for analyzing the light received by the one or more photodetectors, or any combination thereof.

In some examples of the method, apparatuses, and non-transitory computer-readable medium described herein, selectively adjusting one or more transmit power parameters of the one or more light-emitting components to maintain the strength of the signal received at the one or more photodetectors within the one or more signal strength bands, wherein identifying the one or more data set pairs may be based at least in part on selectively adjusting the one or more transmit power parameters.

Some examples of the method, apparatuses, and non-transitory computer-readable medium described herein may further include operations, features, means, or instructions for acquiring physiological data from the user via the wearable device, the physiological data comprising motion data and identifying a satisfaction of a trigger condition for determining the skin tone metric based at least in part on the motion data failing to satisfy a threshold level of motion, wherein transmitting the light, generating the signal, identifying the one or more data set pairs, and determining the skin tone metric may be based at least in part on identifying the satisfaction of the trigger condition.

Some examples of the method, apparatuses, and non-transitory computer-readable medium described herein may further include operations, features, means, or instructions for identifying the satisfaction of the trigger condition based at least in part on the motion data failing to satisfy the threshold level of motion during a time period that the user may be asleep, during a time period that an ambient light level may be less than some threshold level of ambient light, or both.

Some examples of the method, apparatuses, and non-transitory computer-readable medium described herein may further include operations, features, means, or instructions for inputting, to the ML model, an indication of one or more distances between the one or more light-emitting components and the one or more photodetectors, wherein determining the skin tone metric may be based at least in part on the indication of the one or more distances.

In some examples of the method, apparatuses, and non-transitory computer-readable medium described herein, the indication of the one or more distances comprises a size of the wearable device.

In some examples of the method, apparatuses, and non-transitory computer-readable medium described herein, the transmit power parameter of the one or more data set pairs comprises one or more statistical parameters associated with a current that may be provided to the one or more light-emitting components to generate the corresponding signal strength band.

Some examples of the method, apparatuses, and non-transitory computer-readable medium described herein may further include operations, features, means, or instructions for determining a baseline skin tone metric associated with the user based at least in part on additional light transmitted by the one or more light-emitting components and received by the one or more photodetectors and determining an orientation of the wearable device relative to the user based at least in part on a comparison between the skin tone metric and the baseline skin tone metric.

In some examples of the method, apparatuses, and non-transitory computer-readable medium described herein, selectively adjusting an activation state of one or more sensors associated with the wearable device based at least in part on the orientation, wherein the one or more sensors comprise the one or more light-emitting components, the one or more photodetectors, additional sensors, or any combination thereof and acquiring physiological data associated with the user via the wearable device based at least in part on selectively adjusting the activation state of the one or more sensors.

Some examples of the method, apparatuses, and non-transitory computer-readable medium described herein may further include operations, features, means, or instructions for generating, via the wearable device, a user device associated with the wearable device, or both, an instruction for the user to adjust the orientation of the wearable device.

In some examples of the method, apparatuses, and non-transitory computer-readable medium described herein, the skin tone metric comprises a Fitzpatrick scale metric.

In some examples of the method, apparatuses, and non-transitory computer-readable medium described herein, the wearable device comprises a wearable ring device.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for estimating skin tone associated with a user, comprising:
    transmitting light associated with a first wavelength using one or more light-emitting components of a wearable device associated with the user;
    generating a signal based at least in part on the light received at one or more photodetectors of the wearable device, wherein a strength of the signal received at the one or more photodetectors is maintained within one or more signal strength bands throughout one or more time intervals;
    identifying one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals;

inputting the one or more data set pairs into a machine learning model; and determining, using the machine learning model, a skin tone metric associated with the user based at least in part on the one or more data set pairs.

2. The method of claim 1, further comprising:

transmitting second light associated with a second wavelength using the one or more light-emitting components of the wearable device;

generating a second signal based at least in part on the second light received at the one or more photodetectors, wherein a strength of the second signal received at the one or more photodetectors is maintained within one or more additional signal strength bands throughout one or more additional time intervals;

identifying one or more additional data set pairs based at least in part on the second signal, wherein the one or more additional data set pairs comprise a second signal strength band of the one or more additional signal strength bands and a second transmit power parameter of the one or more light-emitting components that corresponds to the second signal strength band during a respective additional time interval of the one or more additional time intervals; and inputting the one or more additional data set pairs into the machine learning model, wherein the skin tone metric is determined using the machine learning model based at least in part on the one or more additional data set pairs.

3. The method of claim 1, wherein the one or more data set pairs comprise a first data set pair associated with a first time interval and a second data set pair associated with a second time interval, the first data set pair comprises a first signal strength band of the signal during the first time interval and a first transmit power parameter used during the first time interval, and the second data set pair comprises a second signal strength band of the signal during the second time interval and a second transmit power parameter used during the second time interval.

4. The method of claim 1, further comprising:

inputting, to the machine learning model, one or more additional data set pairs associated with one or more additional users, wherein the one or more additional data set pairs comprise pairs of additional signal strength bands and corresponding additional transmit power parameters associated with additional wearable devices of the one or more additional users, wherein the skin tone metric is determined using the machine learning model based at least in part on the one or more additional data set pairs.

5. The method of claim 1, further comprising:

determining one or more measurement parameters associated with the user, the wearable device, or both, based at least in part on the skin tone metric; and acquiring physiological data from the user via the wearable device based at least in part on the one or more measurement parameters.

6. The method of claim 5, wherein the one or more measurement parameters comprise a power level associated with the one or more light-emitting components, a burn time associated with the one or more light-emitting components, an algorithm for analyzing the light received by the one or more photodetectors, or any combination thereof.

7. The method of claim 1, further comprising:

selectively adjusting one or more transmit power parameters of the one or more light-emitting components to maintain the strength of the signal received at the one or more photodetectors within the one or more signal strength bands, wherein identifying the one or more data set pairs is based at least in part on selectively adjusting the one or more transmit power parameters.

8. The method of claim 1, further comprising:

acquiring physiological data from the user via the wearable device, the physiological data comprising motion data; and identifying a satisfaction of a trigger condition for determining the skin tone metric based at least in part on the motion data failing to satisfy a threshold level of motion, wherein transmitting the light, generating the signal, identifying the one or more data set pairs, and determining the skin tone metric using the machine learning model are initiated based at least in part on identifying the satisfaction of the trigger condition.

9. The method of claim 8, further comprising:

identifying the satisfaction of the trigger condition based at least in part on the motion data failing to satisfy the threshold level of motion during a time period that the user is asleep, during a time period that an ambient light level is less than some threshold level of ambient light, or both.

10. The method of claim 1, further comprising:

inputting, to the machine learning model, an indication of one or more distances between the one or more light-emitting components and the one or more photodetectors, wherein determining the skin tone metric is based at least in part on the indication of the one or more distances.

11. The method of claim 10, wherein the indication of the one or more distances comprises a size of the wearable device.

12. The method of claim 1, wherein the transmit power parameter of the one or more data set pairs comprises one or more statistical parameters associated with a current that is provided to the one or more light-emitting components to generate the corresponding signal strength band.

13. The method of claim 1, further comprising:

determining a baseline skin tone metric associated with the user based at least in part on additional light transmitted by the one or more light-emitting components and received by the one or more photodetectors; and determining an orientation of the wearable device relative to the user based at least in part on a comparison between the skin tone metric and the baseline skin tone metric.

14. The method of claim 13, further comprising:

selectively adjusting an activation state of one or more sensors associated with the wearable device based at least in part on the orientation, wherein the one or more sensors comprise the one or more light-emitting components, the one or more photodetectors, additional sensors, or any combination thereof; and acquiring physiological data associated with the user via the wearable device based at least in part on selectively adjusting the activation state of the one or more sensors.

15. The method of claim 13, further comprising:

generating, via the wearable device, a user device associated with the wearable device, or both, an instruction for the user to adjust the orientation of the wearable device.

16. The method of claim 1, wherein the skin tone metric comprises a Fitzpatrick scale metric.

17. The method of claim 1, wherein the wearable device comprises a wearable ring device.

18. An apparatus for estimating skin tone associated with a user, comprising:
- a processor;
- memory coupled with the processor; and
- instructions stored in the memory and executable by the processor to cause the apparatus to:
    - transmit light associated with a first wavelength using one or more light-emitting components of a wearable device associated with the user;
    - generate a signal based at least in part on the light received at one or more photodetectors of the wearable device, wherein a strength of the signal received at the one or more photodetectors is maintained within one or more signal strength bands throughout one or more time intervals;
    - identify one or more data set pairs based at least in part on the signal, wherein the one or more data set pairs comprise a signal strength band of the one or more signal strength bands and a transmit power parameter of the one or more light-emitting components that corresponds to the signal strength band during a respective time interval of the one or more time intervals;
    - input the one or more data set pairs into a machine learning model; and
    - determine, using the machine learning model, a skin tone metric associated with the user based at least in part on the one or more data set pairs.

19. The apparatus of claim 18, wherein the instructions are further executable by the processor to cause the apparatus to:
- transmit second light associated with a second wavelength using the one or more light-emitting components of the wearable device;
- generate a second signal based at least in part on the second light received at the one or more photodetectors, wherein a strength of the second signal received at the one or more photodetectors is maintained within one or more additional signal strength bands throughout one or more additional time intervals;
- identify one or more additional data set pairs based at least in part on the second signal, wherein the one or more additional data set pairs comprise a second signal strength band of the one or more additional signal strength bands and a second transmit power parameter of the one or more light-emitting components that corresponds to the second signal strength band during a respective additional time interval of the one or more additional time intervals; and
- input the one or more additional data set pairs into the machine learning model, wherein the skin tone metric is determined using the machine learning model based at least in part on the one or more additional data set pairs.

20. The apparatus of claim 18, wherein the one or more data set pairs comprise a first data set pair associated with a first time interval and a second data set pair associated with a second time interval, the first data set pair comprises a first signal strength band of the signal during the first time interval and a first transmit power parameter used during the first time interval, and the second data set pair comprises a second signal strength band of the signal during the second time interval and a second transmit power parameter used during the second time interval.

* * * * *